Nov. 25, 1924.
B. M. W. HANSON
BEARING
Filed July 10, 1919
1,517,060
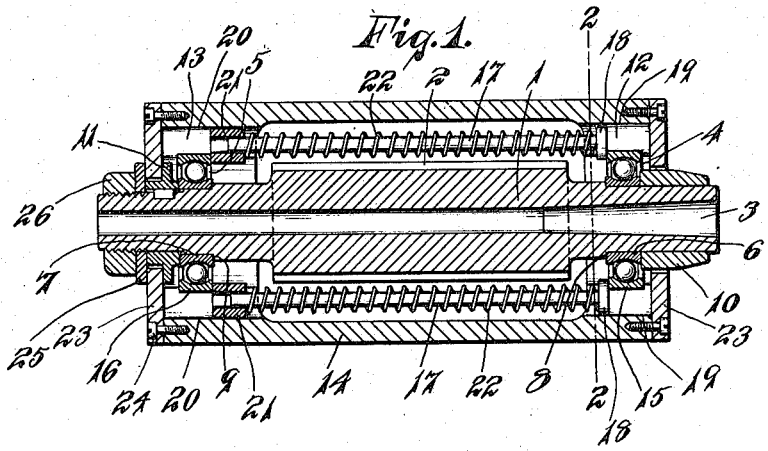
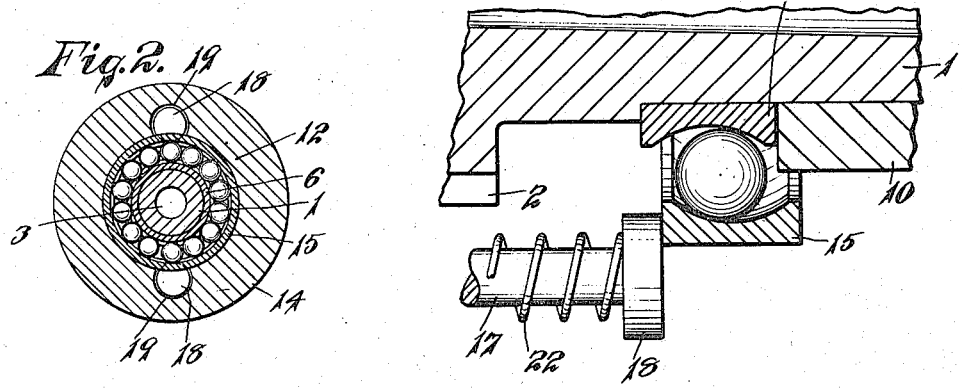
INVENTOR.
Bengt M. W. Hanson:
BY
ATTORNEY.

Patented Nov. 25, 1924.

1,517,060

UNITED STATES PATENT OFFICE.

BENGT M. W. HANSON, OF HARTFORD, CONNECTICUT.

BEARING.

Application filed July 10, 1919. Serial No. 309,961.

*To all whom it may concern:*

Be it known that I, BENGT M. W. HANSON, a citizen of the United States, residing at Hartford, in the county of Hartford, State of Connecticut, have invented certain new and useful Improvements in a Bearing, of which the following is a specification.

It has long been recognized that various rotating parts of machinery such as, for instance, the spindle of a milling machine can very advantageously be carried on ball bearings; that in some instances the efficiency of the bearings is soon impaired because of wear between the parts or injury thereto due to shocks or unusual strains, and that in some cases conditions exist which make the use of ball bearings impractical.

It is the object of the present invention to overcome the difficulties heretofore present, under certain conditions, in the use of ball bearings and to this end I provide an improved structure wherein the bearings are always kept in proper operating condition, the wear between the parts being taken up so that the rotating member or tool may run true and there will be no chattering or grinding of the rotating member, and also wherein the bearings are protected against unusual shocks or strains which may occur such, for instance, as when a tool is positioned in or removed from the spindle.

In the accompanying drawings, I have shown but one embodiment of my invention but it is to be understood that the present disclosure is by way of illustration only and is not to be taken as restrictive of my conception. While I have shown my improvements incorporated in a structure of which a tool spindle forms a part, it is evident that my invention is applicable to various uses to which ball bearings are generally applied.

In describing the invention herein illustrated, the conventional terms will be used but it is to be understood that they are used solely for the purpose of description and they are not to be taken as having any limiting effect.

In the accompanying drawings:

Fig. 1 is a central vertical section of a bearing constructed in accordance with the present invention.

Fig. 2 is a sectional view taken on line 2—2 of Fig. 1, and

Fig. 3 is an enlarged detail showing the adjustment of the bearing.

In the embodiment illustrated in the drawings, the rotary or bearing supported member comprises a spindle 1 having, preferably formed integral therewith, a pinion 2 by which it is driven from any suitable gear connection, which is not here shown. The forward end of the spindle has a tool receiving socket 3 tapered as shown so as to receive the stem of the tool (not shown) and the spindle has a longitudinal bore through which a bar may be passed when necessary to drive out the tool. At either end of the spindle are mounted the ball bearings 4, 5, the inner rings 6, 7 of which come up against the shoulders 8, 9, the inner rings 6 being held in position by the spindle nose cap 10 which is forced onto the end of the spindle, and the inner ring 7 by the thrust collar 11 which is keyed to the spindle and thus the inner rings are maintained in fixed spaced relation on the spindle and move therewith.

One of the rings of each bearing has a sliding fit relative to its suitable supporting member and while, in the present instance, the outer rings are slidably mounted within the supporting members, it is to be understood that the parts may be rearranged without involving a different principle of operation of the bearings. In the present instance, the bearing supporting members comprise collars 12, 13 which may be carried at the opposite ends of the housing 14 and, if desired, they may be formed integral therewith, as shown in the drawings. The outer ring 15 of the bearing 4, in the present case, has a close sliding fit in the bore of the collar 12 at what may be termed the front end of the housing and the outer ring 16 of the bearing 5 has a sliding fit in a corresponding bore of the collar 13 so that these outer rings are free to float longitudinally of the housing.

Between the outer rings 12 and 13 of the bearings are interposed one or more instrumentalities which tend to urge these rings apart. Two such instrumentalities are shown in the drawing and they comprise plunger rods 17, 17 which may have heads 18, 18 at one end slidably supported in guideways 19, 19 consisting of openings extending longitudinally of the collar 12 and opening into the bore of the collar so that the heads engage or abut against the outer ring 15.

The collar 13 has guideways 20, 20 in which are slidably supported plunger sleeves 21, 21 which engage the outer ring 16 of the bearing 5 in a manner similar to the engagement of the heads 18 against the ring 15. These plunger sleeves receive and support the rear ends of the plungers. Between the heads 18 of the plungers and the plunger sleeves 21 are compression springs 22, the normal tendency of which is to force the outer bearing rings 15 and 16 in opposite directions longitudinally of the spindle. By reference to Fig. 3, it will be seen that the compression springs normally urge the sliding or outer ring of each bearing longitudinally of its inner co-operating ring and the result of this action will be to take up any wear which may occur in the bearings and always hold them in proper association so that there is no play or looseness between the balls and the rings between which they are mounted.

The ends of the housing are closed by plates 23, 23 which may be secured in position by any suitable means such, for instance, as by the indicated screws 24. At the rear end of the housing, a thrust washer 25 is provided which, together with the thrust collar 11 and a thrust nut 26 securing the members in position, provides a plain thrust bearing.

When the spindle is subjected to endwise shock, all parts of the ball bearings 4, 5 move with the spindle and since the outer rings 15, 16 are free to float endwise within the housing, the bearings are relieved from the burden of any such shock.

In accordance with the provisions of the patent statutes, I have described the principle of operation of my invention together with the apparatus which I now consider to represent the best embodiment thereof, but I desire to have it understood that the apparatus shown is only illustrative and my invention is susceptible of various modifications and changes.

I claim as my invention:—

1. In a device of the character described, a rotating member, a housing within which said member is mounted and having bores at its opposite ends, ball bearings within said bores and within which said rotating member is supported, the inner rings of said bearings being secured to said rotating member against endwise movement therealong and the outer rings of said bearings being slidably supported for longitudinal movement within said bores, and a thrust bearing between said housing and rotating member.

2. In a device of the character described, a rotary member, a housing, collars at the opposite ends of said housing and having guideways opening into the bores of said collars, ball bearings within the bores of said collars and within which said rotating member is supported, the inner rings of said bearings being secured to said rotating member against endwise movement therealong and the outer rings of said bearings being slidably supported within said bores, a plunger having a head mounted within the guideway of one of said bores and engaging the outer ring of one of said bearings, a sleeve in the guideway of the other of said bores and engaging the outer ring of the other bearing, and a spring between said head and sleeve urging the same apart.

3. In a device of the character described, a housing, a spindle therein, a pair of ball bearing units interposed between said spindle and said housing, each of said units including an inner ring fixed to the spindle, an outer ring slidably supported by and longitudinally movable of said housing and interposed bearings between the inner and outer rings, spring actuated means common to both of said outer bearing rings for simultaneously urging the same apart, and a thrust bearing for limiting the longitudinal movement of said spindle relative to the housing.

BENGT M. W. HANSON.